Dec. 27, 1932.         C. F. OGREN         1,892,625
BRAKE LINING
Filed June 4, 1929

Inventor:—
Carl F. Ogren
by his Attorneys
Howson & Howson

Patented Dec. 27, 1932

1,892,625

UNITED STATES PATENT OFFICE

CARL F. OGREN, OF TRENTON, NEW JERSEY, ASSIGNOR TO THERMOID RUBBER COMPANY, OF TRENTON, NEW JERSEY, A CORPORATION OF NEW JERSEY

BRAKE LINING

Application filed June 4, 1929. Serial No. 368,407.

This invention relates to the so-called "rubberized" lining for brakes, and is more particularly concerned with a process of producing a lining of relatively small number of plies, but having substantially the thickness of the ordinary lining of a greater number of plies, and with the resultant product.

In the process of making linings as ordinarily practiced today, fabric of asbestos or other suitable material, preferably arranged in rolls, is passed through a rubber "friction" calender, at which time one or both sides of the fabric are filled with the rubber friction compound. In this process, only the interstices between the threads of the fabric are filled with the compound, and the thickness of the fabric is not materially changed. This frictioned fabric is cut to the width necessary to make the finished linings; is then folded longitudinally in any desired manner to give the required number of thicknesses or plies; and is subsequently subjected to pressure and heat in a press. This latter operation vulcanizes the plies together, forming one, compact mass.

By my newly developed process, as differentiated from the prior practices, the fabric preferably is first frictioned as in the old method. It is then passed through a "stock" calender which deposits a distinct layer or skin of rubber compound on at least one surface, thus definitely increasing the thickness of the sheet of fabric. The frictioned and skimmed fabric is then preferably cut to width, folded, and vulcanized, after which it emerges as finished brake lining material. An extremely important and advantageous result from this construction is that the number of plies required to build the lining to a given thickness is considerably less than that required in the prior practice, thereby materially decreasing the cost of manufacture and providing a finished product which actually has greater braking efficiency and is more durable than the products of the prior methods.

An object of my invention, therefore, is to produce a brake lining having better wearing properties than the linings of the prior art.

Another object is to produce a brake lining of substantially uniform density throughout.

Another object is to produce a brake lining which shall be substantially the equivalent in efficiency of the molded composition linings, but which shall have flexibility and be free from the drawbacks of brittleness and extreme hardness, which render the molded composition product so relatively difficult to apply to the brake shoe or brake band.

Another and more specific object is to produce a lining in which the number of plies necessary to produce a required thickness of product is considerably reduced as compared with the number necessary when using the prior methods of manufacture.

Still another object is to evolve a process of producing brake lining which comprises the step of providing at least one side of the brake fabric with a skim of suitable friction material preferably in the form of a rubber composition.

A still further object is to provide a novel and highly efficient form of molded fabric lining, as hereinafter more specifically set forth.

Other objects will appear hereinafter.

Figure 1:
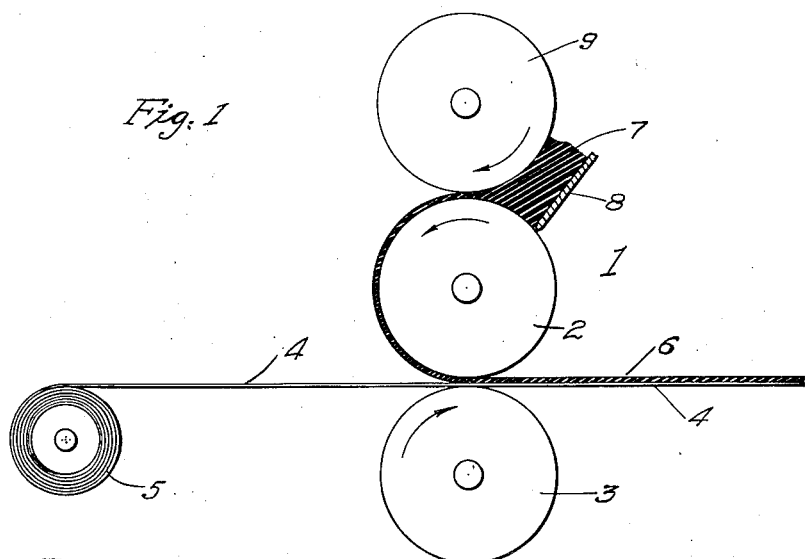
Fig. 1 is a schematic showing of a process conducted in accordance with my invention.

With reference to Fig. 1 of the drawing, the reference numeral 1 broadly indicates what is known as a "stock" calender, the rolls 2 and 3 of which rotate in opposite directions and at approximately the same speed. In accordance with the present invention, a fabric 4 from a suitable source, such as a roll 5, which fabric preferably has been previously frictioned on at least one of its sides in accordance with the well known practice, by having pressed into the interstices thereof a suitable friction material such as rubber or a rubber composition, is passed between the rolls 2 and 3 at a linear velocity corresponding closely to the circumferential velocity of the roll 2. This roll 2 has associated therewith a feed roll 6 and a hopper consisting in the present instance of a retaining wall 7 whereby a suitable plastic material 8 may be supported in contact with the rolls 2 and 6 and whereby a sheet or ribbon of said composition may be fed continuously between the rolls, the thickness of said ribbon being determined by the space between the peripheries of the rolls 2 and 6. The ribbon of plastic material adhering to the face of the roll 2 is thus applied to the upper face of the fabric 4 in a coating or skim of substantially uniform thickness, as indicated at 9, the space between the rolls 2 and 3 being adjusted in accordance with the thickness of the fabric and the thickness of the ribbon 9.

While the plastic material employed may vary, I prefer to employ a rubber composition carrying a relatively high percentage of inert filler, such as barytes or asbestos fibre. Sufficient filler should be employed to render the composition relatively stiff and strong and capable of standing up under pressure applied in a subsequent vulcanizing operation, as hereinafter set forth. A composition of this type has been found particularly well suited to the purpose by reason of its durability and relatively high braking efficiency.

Figure 2:
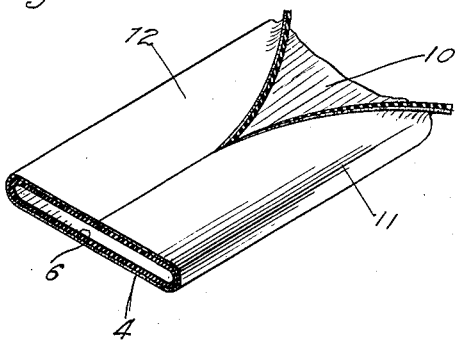
Fig. 2 is a perspective view illustrating a preferred form of product made in accordance with my invention.

The skimmed fabric thus formed may now be divided longitudinally into a plurality of strips of such width that when folded longitudinally upon itself a sufficient number of times to afford a product having the required number of plies or layers, it shall give a finished product of the required width. In Fig. 2, I have illustrated one method of folding to afford a two-ply product. In this instance, equal opposite longitudinal edge portions of the strip are folded inwardly toward each other with their edges abutting at the approximate longitudinal center of the strip, the composition skim being turned inwardly. Preferably the fabric 4 previously has been subjected to a frictioning operation on at least that side which now forms the outer face. The folded strip is now subjected to pressure and heat, preferably between the heated platens of a hydraulic or similar press, to vulcanize the rubber frictioning compositions and to thoroughly compress the material to form a compact strip of substantially uniform density constituting the finished product. By means of the friction composition applied to the surface of the fabric in the form of a skim of appreciable thickness, a two-ply product formed as described above may have the same or greater thickness than a three or more ply article formed in accordance with the prior practice and without the skimmed surface. A material saving in the relatively expensive fabric is thus realized, and at the same time a product is obtained which is the full equivalent, or superior, of prior fabrics of more plies in durability and braking efficiency.

Figure 3:
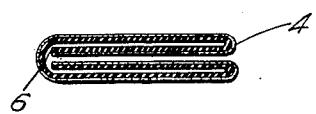
Figs. 3, 4, and 5 are vertical sections illustrating modifications within the scope of the invention.

In Fig. 3, the skimmed fabric has been folded in such manner as to afford a product of four plies and relatively great thickness which is well adapted for use on vehicles, such as trucks, busses or the like, and for industrial heavy-duty purposes.

Figure 4:
Figure 5:

Fig. 4 illustrates the manner of producing a lining of three plies, while in Fig. 5, I have illustrated a method of folding similar to that shown in Fig. 2 and previously described, with the difference that the skim appears at the outside. In each instance, the folded strips are subjected to a pressure and heat sufficient to thoroughly vulcanize the rubber compositions employed both in the frictioning and skimming operations.

The aforedescribed skimmed construction is also highly desirable in conjunction with the production of a molded article as set forth in my copending application Serial No. 368,408 filed of even date herewith. In the process as therein set forth, the folded strips are cut accurately to a length corresponding with the length of the brake shoe or band or section thereof to which the lining is to be applied, and is then placed in a mold in which it is confined on all sides during application of the pressure and heat, which compacts the mass and vulcanizes the friction materials. In this procedure, considerably heavier pressure may be applied by reason of the fact that the lining strip is confined as set forth on all sides, and as a result a molding effect is obtained which accurately sizes the article, renders it extremely dense and compact, and thoroughly waterproofs the side edges and the cut ends by creating a vulcanization of the rubber friction materials.

The finished article obtained by the procedure set forth above possesses highly desirable characteristics of durability and braking efficiency. In efficiency, it is the substantial equivalent of the molded composition linings, but lacks the brittleness and rigidity of the latter, and its flexibility renders it readily handled and applied to the brake bands and shoes without danger of breaking. It will be apparent, therefore, that I have produced a brake band which possesses all the desirable characteristics of both the fabric base and molded composition linings and which accordingly is superior to either.

I claim:

1. A strip of brake lining comprising a fabric frictioned with rubber and skimmed on at least one of its surfaces with a rubber sheet.

2. A strip of brake lining comprising a fabric frictioned with rubber and skimmed on at least one of its surfaces with a rubber sheet, said sheet being folded upon itself to produce a laminated structure.

3. A brake lining comprising a plurality of strips of fabric frictioned with rubber and skimmed on at least one of its surfaces with a rubber sheet, said strips being superposed to provide laminations.

4. A brake lining comprising a plurality of strips of fabric frictioned with rubber and skimmed on at least one of its surfaces with a rubber sheet, said strips being superposed with the skimmed surfaces of adjacent strips juxtaposed to provide a laminated structure.

CARL F. OGREN.